(12) United States Patent
Venes

(10) Patent No.: US 7,306,179 B2
(45) Date of Patent: Dec. 11, 2007

(54) FISHING REEL

(75) Inventor: Sean R. Venes, Bernardsville, NJ (US)

(73) Assignee: SVS Engineering LLC, Bernardsville, NJ (US)

(*) Notice: Subject to any disclaimer, the term of this patent is extended or adjusted under 35 U.S.C. 154(b) by 4 days.

(21) Appl. No.: 11/344,410

(22) Filed: Jan. 31, 2006

(65) Prior Publication Data

US 2007/0176036 A1  Aug. 2, 2007

(51) Int. Cl.
*A01K 89/01* (2006.01)

(52) U.S. Cl. ..................................... 242/322

(58) Field of Classification Search ................ 242/322, 242/295, 296, 307, 317, 318, 606, 608, 610, 242/610.5, 614

See application file for complete search history.

(56) References Cited

U.S. PATENT DOCUMENTS

| | | | |
|---|---|---|---|
| 1,024,739 A * | 4/1912 | Murgas ..................... 242/303 |
| 1,568,149 A | 1/1926 | Foss |
| 1,996,697 A | 4/1935 | Cumings |
| 2,059,765 A | 11/1936 | Adams |
| 2,240,091 A | 4/1941 | Cerne |
| 2,324,324 A | 7/1943 | Rutledge |
| 2,384,561 A | 9/1945 | Muffett |
| 2,551,567 A | 5/1951 | Reyburn |
| 3,510,083 A | 5/1970 | Cook |
| 3,741,493 A * | 6/1973 | Jones ......................... 242/296 |
| 3,799,472 A | 3/1974 | Svensson |
| 3,958,771 A * | 5/1976 | Everett et al. .............. 242/303 |
| 3,967,792 A * | 7/1976 | Goedl ......................... 242/317 |
| 3,993,267 A | 11/1976 | Murvall |
| 4,153,220 A * | 5/1979 | Nakajima ................... 242/296 |
| 4,515,325 A | 5/1985 | Ito |
| 4,527,753 A * | 7/1985 | Jones ......................... 242/296 |
| 4,540,135 A * | 9/1985 | Uetsuki et al. ............. 242/296 |
| 4,542,862 A * | 9/1985 | Romike et al. .......... 242/405.1 |
| 4,750,687 A * | 6/1988 | Sievert et al. .............. 242/295 |
| 4,966,336 A | 10/1990 | Humble et al. |
| 5,149,009 A | 9/1992 | Sato |
| 5,192,036 A | 3/1993 | Sato |
| 5,374,002 A | 12/1994 | Sato |
| 5,556,050 A | 9/1996 | Baisch et al. |
| 5,655,722 A | 8/1997 | Muckridge |
| 5,752,667 A * | 5/1998 | Merrill et al. .............. 242/296 |
| 5,897,075 A * | 4/1999 | Elder et al. .............. 242/608.2 |
| 5,918,826 A * | 7/1999 | Arkowski ................... 242/295 |
| 5,971,317 A * | 10/1999 | Jaros ......................... 242/614 |
| 6,003,799 A | 12/1999 | Jung |
| 6,065,699 A * | 5/2000 | Sacconi ..................... 242/286 |
| 6,354,526 B1 | 3/2002 | Morise |
| 6,382,544 B1 | 5/2002 | Park |
| 6,382,545 B1 * | 5/2002 | Yeh ........................... 242/317 |

(Continued)

*Primary Examiner*—Emmanuel M Marcelo
(74) *Attorney, Agent, or Firm*—Lerner, David, Littenberg, Krumholz & Mentlik, LLP

(57) ABSTRACT

A relatively lighter fishing reel with a spool having an inner annular member with circumferentially spaced indentations or gaps on the outer edge of the periphery which coacts with a spring and pawl assembly to prevent free spinning of the spool during payout and retrieval of the fishing line. The operative coaction of this mechanism and a unidirectional roller clutch bearing for rotationally mounting the spool with a manually adjustable drag assembly act to control the forces and tensions acting during payout of the fishing line in the use of the fly fishing reel.

9 Claims, 4 Drawing Sheets

U.S. PATENT DOCUMENTS

| | | | |
|---|---|---|---|
| 6,412,724 B1 * | 7/2002 | Ferrara, Jr. | 242/322 |
| 6,550,709 B2 | 4/2003 | Vashro | |
| 6,641,071 B1 * | 11/2003 | Yeh | 242/317 |
| 6,732,965 B2 | 5/2004 | Bascue, Jr. | |

* cited by examiner

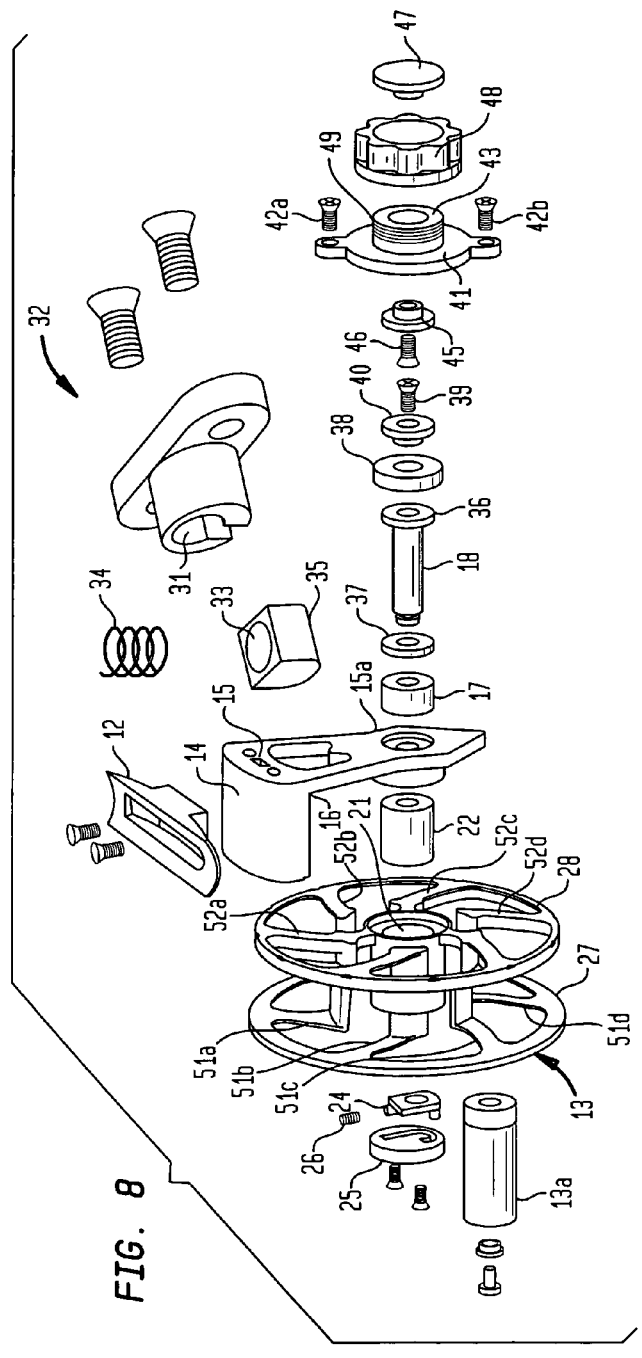
FIG. 8
FIG. 9
FIG. 10
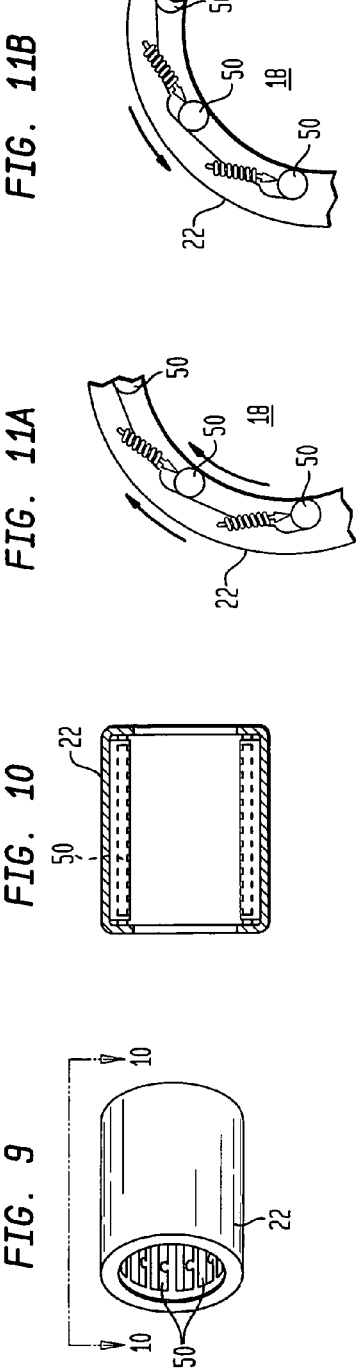
FIG. 11A
FIG. 11B

FISHING REEL

BACKGROUND OF THE INVENTION

This invention relates generally to fishing reels and more particularly to a fly fishing reel which is lighter in weight by reason of an improved spool construction, has a new mechanism for controlling and stopping the free spinning of the spool during payout and retrieval of fishing line, and an improved drag system which co-acts with the mechanism for controlling the free spinning of the fishing line and operates to establish the force and tensions exerted by the spool on the fishing line, during payout of the fishing line when landing and/or netting a hooked fish.

The construction and operation of small and large arbor fly fishing reels are well known in the art. Drag assemblies in fly fishing reels with unidirectional acting bearings to enable a fly fishing line to be reeled in smoothly and to control the forces or pressures acting on the fishing line during payout from the spool of the fly fishing reel to prevent breakage of the fishing line are known to those skilled in this art, as indicated by U.S. Pat. Nos. 3,510,083; 6,354,526 and 6,550,709.

Thus, in Pat. No. '526 a single bearing fly fishing reel is shown having a generally U-shaped body or frame on which a drag mechanism is mounted. The drag mechanism has a transversely disposed shaft on which a sliding bearing is provided for rotatably supporting the spool. A roller clutch member couples the spool to the drag mechanism only when the fishing line is being cast or paid out from the spool. This patent discloses a "clicking mechanism" to provide a sound when the fishing line is being paid-out.

Devices for fishing reels to prevent the free payout of fishing line from the spool are also known, as indicated by U.S. Pat. Nos. 1,568,149; 2,324,324; 2,384,561; 3,799,472 and 5,374,002.

The present invention provides a lighter fly fishing reel because less weight aids in reducing fatigue so as to enable a user to extend the length of time they can enjoy fishing with a fly fishing rod utilizing the improved fly fishing reel of the present design. Lower weight is achieved by improving the design of the fishing reel for controlling the payout and retrieval of fishing line from the spool, providing a drag assembly operatively associated with this improved design for controlling payout and retrieval of the fishing line from the spool and by the reduction in the number of the operatively related parts for achieving these beneficial results.

Thus, the present invention provides an improved mechanism for controlling and stopping the free spinning of the spool during payout and retrieval of the fishing line from the spool when the drag assembly is not engaged but provides an operative drag assembly with a unidirectional roller clutch bearing for rotatably mounting the spool for adjusting the forces and tension acting on the fishing line to prevent rupture and breakage of the line during payout and landing or netting of a hooked fish.

SUMMARY OF THE INVENTION

It is one aspect of the present invention to provide a lighter weight fly fishing reel by modifying the design and structure of the fly fishing reel so that strong but lighter weight materials can be used for the spool and other operative parts of the reel.

It is another aspect of the present invention to provide a fly fishing reel with a payout and retrieval assembly including a new and improved spool disposed to engage an operatively related spring mounted pawl for controlling and intermittently stopping the free spinning of the spool during payout and retrieval of the fishing line.

It is a another aspect of the present invention to provide a fly fishing reel with a modified drag assembly for adjusting the force and tension exerted by the spool only during payout of the fishing line during use of the fly fishing reel.

It is a further aspect of the present invention to provide a fly fishing reel with a pawl assembly for controlling and stopping the free spinning of the spool during payout and retrieval of the fishing line which coacts with an improved drag assembly on the fly fishing reel to enable the force and tension on the fishing line to be maintained during payout and in the landing and/or netting of a hooked fish.

It is still another aspect of the present invention to provide a drag assembly for a fly fishing reel in which the drag assembly adjusts the forces acting on the spindle for mounting the spool, and the spool utilizes a unidirectional roller clutch bearing such that the spool can turn freely in the direction for rewinding the fishing line but will have more or less frictional engagement with the associated spindle as a function of the adjustment of the forces or pressure acting on the spindle and drag assembly and the spool for preventing free payout of the fishing line.

BRIEF DESCRIPTION OF THE DRAWINGS

FIG. 5A is an enlarged fragmentary view of the periphery of the inner annular member of the spool and the operatively associated spring mounted pawl as shown in FIG. 5, FIG. 5B is an enlarged fragmentary left side view of the periphery of the inner annular member of the spool and the operatively associated pawl assembly, partly in vertical section, as shown in FIGS. 5 and 5A, FIG. 5C is an enlarged fragmentary view of the drag assembly shown in cross-section in FIG. 5, FIG. 8 is an exploded view of the fly fishing reel shown in FIG. 1 with the pawl assembly enlarged, FIG. 9 is an enlarged perspective view of the unidirectional roller clutch bearing for the spool, as shown in FIGS. 5 and 8, for rotatably mounting the spool, FIG. 10 is a cross-section taken on line 10-10 of FIG. 9, FIG. 11A is a diagrammatic illustration of the unidirectional roller clutch bearing shown in FIGS. 5, 8 and 9, rotating in the clockwise direction, and FIG. 11B is a diagrammatic illustration of the unidirectional roller clutch bearing shown in FIGS. 5, 8 and 9, rotating in the counterclockwise direction.

DETAILED DESCRIPTION

Figure 1:
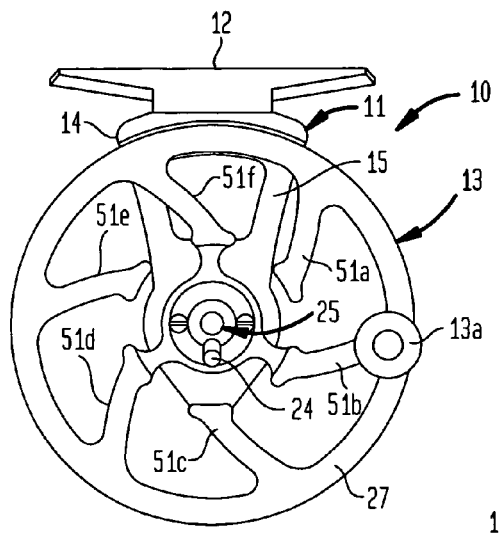
FIG. 1 is a right side view of the fly fishing reel in accordance with the present invention.
Figure 2:
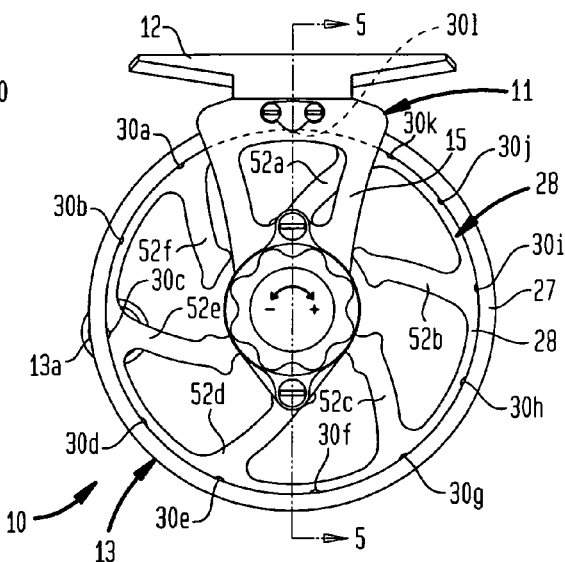
FIG. 2 is a left side view of the fly fishing reel shown in FIG. 1.
Figure 3:
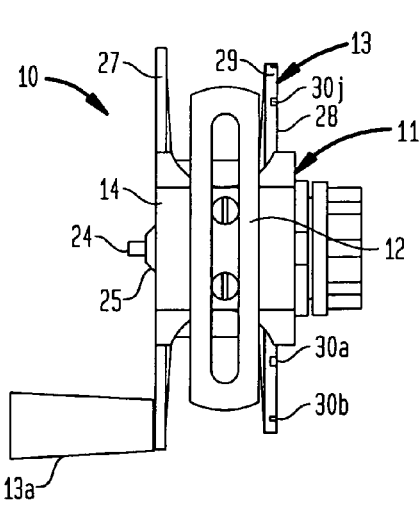
FIG. 3 is a top plan view of the fly fishing reel shown in FIG. 1.
Figure 4:
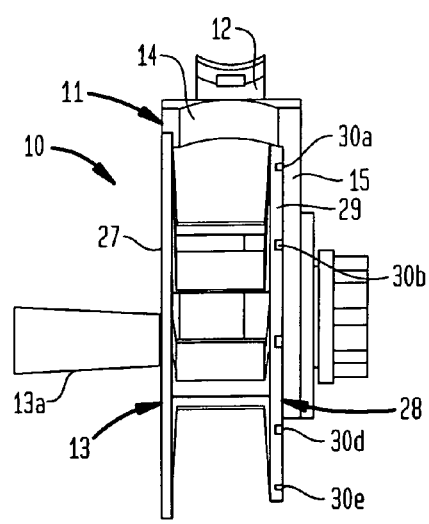
FIG. 4 is a front view of the fly fishing reel shown in FIG. 1.

Referring to the drawings, the figures show a fly fishing reel in accordance with the present invention, generally designated 10, of the small arbor type. While the present invention is being illustrated and shown for small arbor type fly fishing reels, it is also adapted, for and within the scope of the present invention, for use on large arbor fly fishing reels or other types of fishing reels. Fishing reel 10 has a frame 11 with shaped means 12 for connecting the fishing reel 10 to an associated fly fishing rod, not shown, by conventional slidable and detachable locking members, also not shown. Rotatably mounted in the frame 11 is a spool 13, as hereinafter more fully described, for fishing line, also not shown, which will be wound about the spool 13. When the fishing reel 10 is connected in assembled position on the fly fishing rod, the fishing line mounted in the spool 13 of the fishing reel is passed along the associated fly fishing rod so that the fishing line can be paid-out from and rewound onto the spool 13 of the fishing reel 10. Fly fishing reels and other types of fishing reels, the means for connecting the fishing reel 10 to fly and other types of fishing rods, and the attaching of the fishing line to the spool and to an associated fishing rod, are well known to those skilled in the art and therefore will not be more fully shown or described.

FIGS. 1, 2, 3, 4 and 5 show that the frame 11 for the fishing reel 10 in accordance with the present invention is a generally L-shaped member having a horizontal leg 14 and a downwardly extending and generally vertical leg 15 which define a corner section 16. Affixed to the upper or top face of the horizontal leg 14 is the shaped connector 12. On frame 11, a spaced distance from the upper end, the downwardly extending or vertical leg 15 has a centrally shaped and formed opening or bore 15a disposed generally in the transverse centerline of the fishing reel 10 in which is mounted a conventional roller bearing 17. Rotatably mounted in the roller bearing 17 is a spindle or shaft 18 of a drag assembly generally designated 19. The spindle 18 is made long enough to extend along, into and through the transverse centerline of the fishing reel, beyond the inner face of vertical leg 15. Spool 13 has a central arbor 20 having a bore 21 extending end to end therethrough. Mounted in the bore 21 is a unidirectional roller clutch bearing 22. When the spool 13 is assembled on the spindle or shaft 18, the spool 13 can be rotated manually by the handle member 13a in a clockwise direction for paying out fishing line from the spool and a counterclockwise direction for retrieving fishing line as may be necessary or desirable during use of fishing reel 10.

Further, spindle 18 at its outer end has an annular groove 23 so that a spring operated latch member 24 on a releasable locking assembly 25 affixed to the outer face of the central arbor 20 of the spool 13 can be manually adjusted by sliding the latch member 24 to engage and disengage with the annular groove 23 on spindle 18. A spring member 26 in the releasable locking assembly 25 holds the latch member 24 in the engaged position to hold the spool in assembled position on the spindle, all of which is shown in FIGS. 1, 3, 5 and 8 of the drawings.

Figure 5:
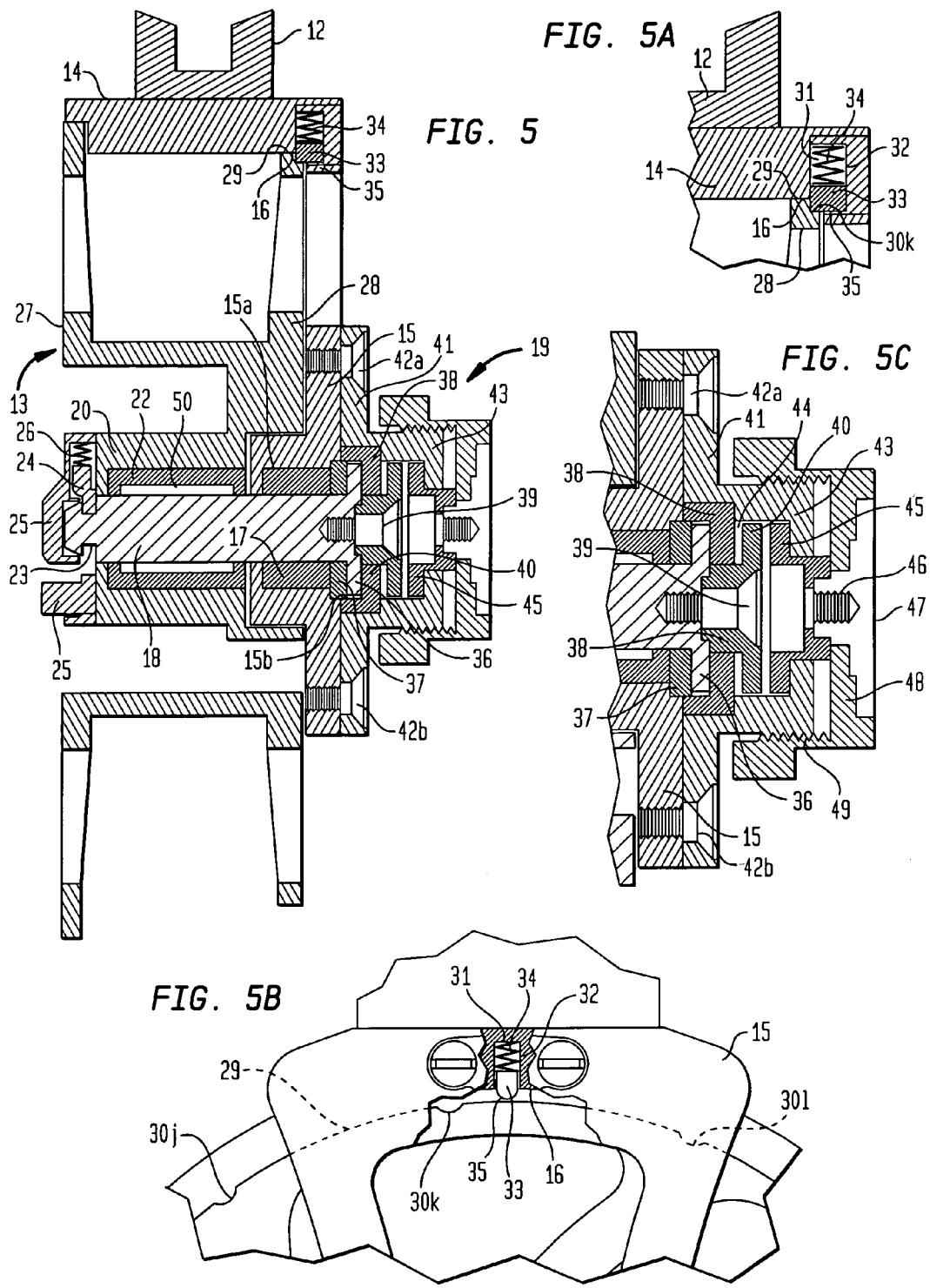
FIG. 5 is an enlarged cross section taken on line 5-5 of FIG. 2, showing the operatively associated elements of the drag assembly.
Figure 6:
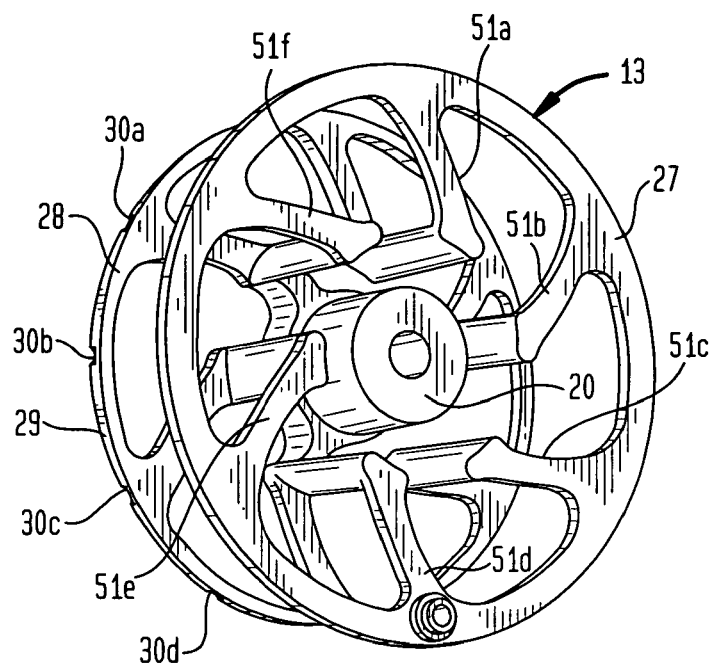
FIG. 6 is an enlarged right sided perspective view of the spool for the fly fishing reel shown in FIG. 1.
Figure 7:
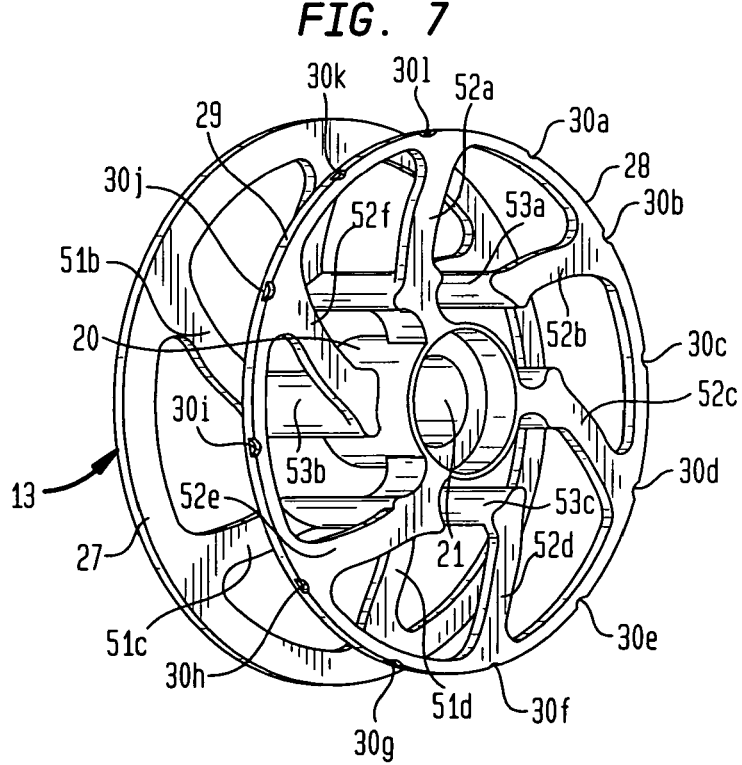
FIG. 7 is an enlarged left sided perspective view of the spool for the fly fishing reel of FIG. 1 showing the notched indentation on the periphery of the inner annular member of the spool.

Connected on the outer face of the central arbor 20 of the spool 13 is an outer annular member 27 and on the inner face, an inner annular member 28. The inner annular member 28 is smaller in diameter than the outer annular member 27 so that when the spool 13 is in assembled position, the outer periphery 29 of the inner annular member 28 will be in proximate relation to the corner section 16 formed by horizontal leg 14 and vertical leg 15 of the frame 11, as is shown by FIGS. 5, 5A and 5B. Further, the inner annular member 28 has a plurality of circumferentially spaced indents or gaps as at 30a, 30b, 30c, 30d, 30e, 30f, 30g, 30h, 30i, 30j, 30k and 30l on the outermost edge of the outer periphery 29 of the inner annular member 28.

In the corner section 16, a mounting chamber or space 31 is formed which has an opening into the corner section adjacent to the point where the outer periphery 29 of the inner annular member 28 will be disposed in assembled position. Mounted in the chamber 31 is a pawl assembly generally designated 32 which includes pawl 33 and spring 34. Pawl 33 has a rounded and shaped face 35 and fits in the space or chamber 31 so that the rounded face 35 projects and rides on and adjacent to the outer edge of the periphery 29 of the inner annular member 28 when it is in assembled position. Spring 34 acts to maintain the pawl 33 so that it extends through the opening and outward beyond the inner face of the corner section 16. The pawl 33 is so mounted and held in the corner section 16 that when the spool 13 is in assembled position, the curved and rounded end 35 of the pawl 33 will ride on and slide along the outer edge of the periphery 29 of the inner annular member 28 on the spool 13, all of which is shown in FIGS. 2, 5, 5A and 5B of the drawings.

During rotation of the spool 13 in the clockwise direction, if the drag assembly is not exerting any forces on the spindle or shaft 18, the spring 34 of the pawl assembly 32 exerts sufficient force on the pawl 33 to enable the shaped end 35 of the pawl member 33 to engage and disengage with the spaced indents or gaps 30a, 30b, 30c, 30d, 30e, 30f, 30g, 30h, 30i, 30j, 30k and 30l on the outermost edge of the periphery 29 of the inner annular member 28. Thus, in operation when the drag assembly 19 is not exerting any forces on the spindle or shaft 18, the shaped face 35 of the pawl 33 is so formed and shaped that when the spool 13 is manually rotated in a clockwise direction for paying out fishing line, it will intermittently engage and stop the rotation of the spool in the payout direction and thus control and prevent free payout of fishing line.

The spool 13 and its coaction with the pawl assembly 32 also are operatively related to the drag assembly 19 and aid and abet the action of the drag assembly 19 for maintaining more or less force on the spindle 18 and the fishing line during use of the fishing reel 10. Thus, spindle 18 at its inner end remote from the annular groove 23 has an annular collar 36 so that when the spindle 18 is in assembled position, the annular collar 36 will engage a washer 37 disposed in an annular space 15b about the formed opening or bore 15a in the vertical leg 15 of the frame 11 so that it abuts against the thrust bearing 17. Affixed at the inner end of the spindle or shaft 18 is a cap member 38 which fits about the annular collar 36 and is held and affixed in assembled position with a first friction surface member 40 by threaded member 39 connected onto the inner end of the spindle 18. Thus, spindle 18, the annular collar 36, the cap member 38 and first friction surface member 40 are held together in assembled position by the threaded member 39, all of which is shown in FIGS. 5, 5C and 8 of the drawings.

The drag assembly 19 has a drag assembly housing 41 that has a generally circular shape and is connected by threaded flat head screws 42a and 42b to the exterior face of the vertical leg 15 of the frame 11 generally in the transverse centerline of the fishing reel 10. The central portion of the drag assembly housing 41 forms a generally circular outward projection or boss 43 which defines an inner compartment 44 shaped to fit about the annular collar 36, the cap 38, the first friction surface member 40 and threaded member 39, all connected to the inner end of the spindle 18. The inner compartment 44 is large enough for a slidable and movable second friction surface member 45 disposed for movement towards and away from the first friction surface member 40 for exerting more or less force on this first friction member 40 and hence the spindle 18 connected thereto. The second friction surface member 45 is connected by a threaded flat head screw 46 and center disk 47 to a drag adjustment knob 48. The boss 43 is threaded about the exterior portion as at 49 for mounting in threaded engagement the drag adjustment knob 48 which can be manually threaded in and out on the boss 43. Whenever the drag adjustment knob 48 is adjusted, the second friction surface member 45 will move therewith towards or away from the first friction surface member 40, thereby adjusting the force exerted on the first friction surface member 40 and the spindle 18 connected thereto. Since the spool 13 is disposed about the spindle 18, the varying forces and tension acting on the spindle are transmitted to the fishing line being paid-out or retrieved by the spool.

Thus, the operation of the fishing reel 10 and the forces and tensions exerted on the fishing line are augmented by the structure and operation of the spool 13, its unidirectional roller clutch bearing 22 and the associated pawl assembly 32 during payout and retrieval of the fishing line. During general payout, free running of the fishing line is prevented because of the intermittent engagement of the curved and shaped surface 35 of the pawl member 33 with the gaps or indents 30a to 30l inclusive on the outermost edge of the periphery 29 on the inner annular member 28 of the spool 13. When the spool 13 is rotated in a clockwise direction for paying out the fishing line, the unidirectional roller clutch bearing 22 acts like a brake to grab the spindle 18 and turn the spindle 18 in the clockwise direction because of the internal construction of the rollers 50, as is shown by FIG. 11A of the drawings, and during use of the fishing reel 10 acts to control exertion of further force and tension on the fishing line being paid out. Conversely, however, when the spool 13 is rotated in a counterclockwise direction for retrieving of the fishing line, the unidirectional roller clutch bearing 22 releases from the spindle shaft 18, as shown by FIG. 11B. The unidirectional roller bearing 22 spins freely on the spindle 18, but the pawl assembly 32 will still interact with the spool at gaps or indents 30a to 30l, inclusive, to prevent the spool 13 from free spinning and prevent tangle and breakage of the fishing line during retrieval.

Thus, as disclosed, the fly fishing reel in accordance with the present invention has a reduced number of parts. Further, the base 11 will be made of aluminum except that the pawl member will be made of a bearing material such as bronze and the rotatable spindle or shaft 18 of steel to withstand the wear. Further, the spool 13 will be machined from a block of aluminum, and the outer annular member 27 has a first plurality of radially extending ribs as at 51a, 51b, 51c, 51d, 51e and 51f. The inner annular member 28 has a second plurality of radially extending ribs as at 52a, 52b, 52c, 52d, 52e and 52f which are so disposed in general alignment with each other that a lesser number of these respective radially extending ribs will be required for engagement with the central arbor 20 and at least a portion of the respective generally aligned radially extending ribs can be foreshortened and connected by transverse members to reduce the weight of the spool. Thus, first and second radially extending ribs 51a and 52b, 51b and 52f, and 51d and 52d are connected to each other by transverse support members 53a, 53b and 53c respectively, all of which are shown in FIGS. 1, 2, 6, 7 and 8 of the drawings.

Although the invention herein has been described with reference to a particular embodiment, it will be understood that this embodiment is merely illustrative of the principles and applications of the present invention. It is therefore to be understood that numerous modifications may be made to the illustrated embodiment and that other arrangements may be devised without departing from the spirit and scope of the present invention as defined by the appended claims.

The invention claimed is:

1. A spool for a fishing reel comprising a central arbor, an outer annular member on the central arbor, an inner annular member on said central arbor spaced from said outer annular member to define a space on the central arbor, the inner annular member has a smaller diameter than the outer annular member, said inner annular member having an outer peripheral edge and a plurality of spaced circumferential indentations on the outer side of the outer peripheral edge of said inner member, and the circumferentially spaced indentations are generally evenly spaced from each other.

2. A spool for a fishing reel comprising a central arbor, an outer annular member on the central arbor, an inner annular member on said central arbor spaced from said outer annular member to define a space on the central arbor, the outer annular member has a first plurality of radially extending ribs, the inner annular member has a second plurality of radially extending ribs, and at least one of said first radially extending ribs and second radially extending ribs are connected to each other and not to the central arbor to reduce the weight of the spool.

3. A spool for a fishing reel comprising:
   a. a frame,
   b. a spool having a central arbor rotatably mounted in said frame,
   c. said spool having an outer annual member connected to one end of said central arbor and an inner annular member connected to the opposite end of said central arbor,
   d. the outer annular member having a first plurality of radially extending ribs and the inner annular member having a second plurality of radially extending ribs,
   e. at least one of said first radially extending ribs and said second radially extending ribs connected to each other and not to said central arbor, and
   f. said spool machined from a block of aluminum whereby the weight of said spool is reduced.

4. A fishing reel for a fishing rod comprising:
   (a) a frame having means thereon for connecting the fishing reel to the fishing rod,
   (b) a spool member having a central arbor, an outer annular member on said central arbor, an inner annular member on said central arbor spaced from said outer annular member to define a space for fishing line to be paid out along the fishing rod when the frame is in assembled position on the fishing rod,
   (c) said inner annular member has a smaller diameter than the outer annular member and an outer peripheral edge,
   (d) a plurality of spaced circumferentially disposed indentations on the outer side of the outer peripheral edge on said inner member,
   (e) spring actuated pawl assembly mounted in said frame including a shaped and sized pawl member, and
   (f) the shaped and sized pawl member on the spring actuated pawl assembly and said circumferentially disposed indentations disposed in same frame for intermittent engagement when fishing line is being paid out from and retrieved by said spool for controlling and preventing the free payout of fishing line from the spool.

5. In the fishing reel as in claim 4 wherein:
(a) said frame has an L-shape defining a corner section on the inner side of the frame,
(b) said spring actuated pawl assembly including the pawl member mounted in the corner section of said frame,
(c) said pawl member having a shaped face disposed in assembled position to extend past the corner section into the inner side of the frame, and
(d) said peripheral edge of the inner member in assembled position disposed so that the shaped face of the pawl member will intermittently engage the spaced indentations on the peripheral edge whenever the spool is rotated.

6. A fishing reel for a fishing rod comprising:
(a) an L-shaped frame to be connected to the fishing rod, having a horizontal leg and a downwardly extending vertical leg defining a corner section,
(b) a spring actuated pawl assembly including a pawl mounted in the frame, and said pawl having a shaped face disposed to extend into the corner section,
(c) a spool member rotatably mounted in the frame for fishing line to be paid out along the fishing rod when the frame is in assembled position on the fishing rod,
(d) said spool member having an outer annular member and an inner annular member disposed in spaced relation to each other to define a space for said fishing line,
(e) said inner annular member having a peripheral edge disposed adjacent the corner section when the spool is in assembled position in the frame,
(f) a plurality of spaced indentations on the peripheral edge of the inner annular member, and
(g) said plurality of indentations and the shaped face of the spring actuated pawl operatively associated for controlling and preventing the free payout from and retrieval of fishing line by the spool when the spool is rotated in the clockwise and counterclockwise direction.

7. In the fishing reel as in claim 6 further comprising:
(a) a drag assembly mounted on said frame having a rotatable spindle extending generally in the transverse center line of the frame, and means on the drag assembly for exerting an adjustable amount of force during rotation of the spindle,
(b) a spool having a central arbor, and
(c) a unidirectional roller clutch bearing mounted in said central arbor to enable said spool in assembled position in the frame to be rotatably mounted about said spindle, whereby during clockwise rotation of the spool during payout of the fishing line, the spool will act to abet the force and tension exerted by the drag assembly.

8. A fishing reel comprising:
(a) an L-shaped frame to be connected to the fishing rod, having a horizontal leg and a downwardly extending vertical leg defining a corner section,
(b) a spring actuated pawl assembly including a pawl mounted in the frame, and said pawl having a shaped face disposed to extend into the corner section,
(c) said spool member having an outer annular member and an inner annular member disposed in spaced relation to each other to define a space for fishing line,
(d) said spool member rotatably mounted in the frame to enable said fishing line to be paid out along the fishing rod when the frame is in assembled position on the fishing rod,
(e) said inner annular member having an outer peripheral edge disposed adjacent said corner section when the spool is in assembled position on the frame,
(f) a plurality of spaced indentations on the outer side of said peripheral edge on the inner annular member,
(g) said plurality of shaped indentations at all time intermittently engage the shaped face of the pawl on the spring actuated pawl assembly for controlling and preventing the free payout from and retrieval of fishing line by the spool when the spool is rotated in the clockwise and counterclockwise direction,
(h) a drag assembly mounted on said frame having a rotatable spindle extending generally in the transverse centerline of the frame, and means on the drag assembly for exerting an adjustable amount of force during rotation of the spindle, and
(i) a unidirectional roller clutch bearing mounted in said central arbor to enable the spool to be rotatably mounted about said spindle, whereby during clockwise rotation of the spool during payout of fishing line, the spool will act to abet the force and tension exerted by the drag assembly on the spindle and on the fishing line being paid out.

9. In a fishing reel for a fishing rod comprising:
(a) an L-shaped frame to be connected to the fishing rod, having a horizontal leg and a downwardly extending vertical leg defining a corner section,
(b) a spring actuated pawl assembly including a pawl mounted in the frame, and said pawl having a shaped face disposed to extend into the corner section,
(c) said spool member having an outer annular member and an inner annular member disposed in spaced relation to each other to define a space for fishing line,
(d) said spool member rotatably mounted in the frame to enable said fishing line to be paid out along the fishing rod when the frame is in assembled position on the fishing rod,
(e) said inner annular member having an outer peripheral edge disposed adjacent said corner section when the spool is in assembled position on the frame,
(f) a plurality of spaced indentations on the outer side of said peripheral edge on the inner annular member, and
(g) said plurality of spaced indentations at all time intermittently engage the shaped face of the pawl on the spring actuated pawl assembly for controlling and preventing the free payout from and retrieval of fishing line by the spool when the spool is rotated in the clockwise and counterclockwise direction.

* * * * *